United States Patent Office 3,037,014
Patented May 29, 1962

3,037,014
WATER-INSOLUBLE DISAZO-DYESTUFFS
Hans Wilhelm Liechti, Oberwil, Switzerland, assignor to Ciba Limited, Basel, Switzerland, a company of Switzerland
No Drawing. Filed Feb. 3, 1961, Ser. No. 86,858
Claims priority, application Switzerland Feb. 11, 1960
6 Claims. (Cl. 260—187)

This invention provides new disazo-dyestuffs which are free from acid groups imparting solubility in water and correspond to the general formula (1)    A—N=N—B—N=N—D in which A, B and D each represent a benzene radical, and A contains a carboxylic acid ester group and D contains a hydroxyl group in para-position to the azo linkage.

The invention also provides a process for the manufacture of the disazo-dyestuffs of the above Formula 1, wherein a diazo-compound of an amino-azo-dyestuff which is free from acid groups imparting solubility in water and corresponds to the formula (2)    A—N=N—B—NH$_2$ in which A and B have the meanings given above, is coupled with an oxy-benzene capable of coupling in para-position to the hydroxyl group.

Of special interest are those amino-azo-dyestuffs of the Formula 2 which contains as further substituents at most halogen atoms or lower alkyl or alkoxy groups, and in which A is a benzene radical which contains the carboxylic acid ester group in m- or para-position to the azo linkage. The radical B advantageously corresponds to the formula

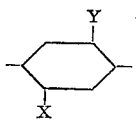

in which X and Y each represent a hydrogen atom or a lower alkyl or alkoxy group.

The dyestuffs of the Formula 2 can be obtained by coupling a diazotised aminobenzoic acid ester with an amino benzene free from acid groups imparting solubility in water as middle component.

As initial components there are advantageously used esters of m- or para-aminobenzoic acid. In the ester group of the formula —COOR, R is advantageously an alkyl group containing not more than 5 carbon atoms, especially an alkoxyalkyl group or a hydroxyalkyl group. R may also be an aralkyl group, for example, a benzyl group. As examples there may be mentioned: the methyl, ethyl, β-hydroxyethyl, β-methoxyethyl, β-ethoxyalkyl, β-cyanethyl, propyl, isopropyl or butyl or benzyl ester of m- or para-aminobenzoic acid, and also of 2-chloro-5-aminobenzoic acid, of 3-methyl-4-amino-benzoic acid and of 3-amino-6-methoxybenzoic acid. As examples of diazo components containing two carbalkoxy groups, there may be mentioned 4-amino-phthalic acid dimethyl ester and 5-amino-isophthalic acid dimethyl ester.

As middle components there may be mentioned: aniline, 2-chloroaniline, 2- and 3-methoxy- or 2- and 3-ethoxy-aniline, 2:5-dimethoxy aniline, 2:5-diethoxy aniline, 2- or 3-methyl aniline, 2:5-dimethylaniline, 2-methoxy-5-methylaniline or 2-ethoxy-5-methylaniline. The coupling is advantageously carried out in a weakly acid to weakly alkaline medium, for example, a medium rendered acid with acetic acid or rendered alkaline with bicarbonate. If the middle component has little coupling capability, it is generally of advantage to couple it in the form of an ω-methane sulfonic acid thereof, and to split off the ω-methane sulfonic acid group subsequently. The diazotization of the amino-azo-dyestuffs of the Formula 2 can be carried out by the usual known methods, for example, with the use of hydrochloric acid and sodium nitrite. The diazo-azo-compounds so obtained are coupled in an alkaline medium, for example, a medium rendered alkaline with an alkaline metal carbonate, with the end components, if desired in the presence of an agent that assists coupling, such as pyridine or picoline.

As end components there are used hydroxybenzenes capable of coupling in para-position, for example, hydroxybenzene itself, 2- or 3-methyl-1-hydroxybenzene, 2-chloro-1-hydroxybenzene, 2- or 3-methoxy-1-hydroxybenzene or 2:5- or 3:5-dimethyl-1-hydroxy-benzene.

The new disazo-dyestuffs, especially after being suitably pasted, which may be combined with reprecipitation, for example, from sulfuric acid, are very suitable for dyeing or printing hydrophobic fibrous materials, for example, cellulose esters or ethers, polyamides or polyurethanes, polyvinyl chloride, and especially fibers of polyesters, for example, of polyethylene terephthalates. There are obtained by the usual dyeing methods, for example, from a dye liquor which contains a dispersion of the dyestuff and a dispersing agent, at a temperature close to 100° C., if desired in the presence of a swelling agent, or at a temperature above 100° C. with the use of superatmospheric pressure, pure and generally strong orange to scarlet-red dyeings, which are distinguished by their especially good fastness to light and sublimation.

The following examples illustrate the invention, the parts and percentages being by weight.

*Example 1*

16.5 parts of 4-aminobenzoic acid ethyl ester are diazotized in the usual manner and coupled with 15.3 parts of 1-amino-2:5-dimethoxybenzene in an acetic acid solution. The aminomonoazo dyestuff so formed is isolated, suspended in dilute hydrochloric acid and diazotized with sodium nitrite at 15 to 20° C. The diazo compound is coupled at 5 to 10° C. with a solution of 9.4 parts of hydroxybenzene in 100 parts of water, 10 parts of sodium hydroxide solution of 30% strength, 20 parts of sodium carbonate and 20 parts of sodium acetate. Coupling, giving rise to the disazo dyestuff, sets in immediately. The dyestuff is filtered off, washed with water until the washings are neutral and dried.

The new water-insoluble dyestuff of the formula

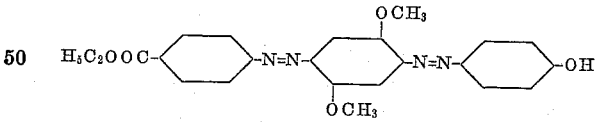

forms a brown powder which in a state of fine dispersion dyes acetate rayon, triacetate rayon and polyamide fibers scarlet tints having excellent fastness properties. More especially, the new dyestuff produces on polyester fibers brilliant scarlet tints having outstanding fastness to sublimation.

A dyestuff having similar excellent properties is obtained by using as initial component 3-aminobenzoic acid ethyl ester instead of 4-aminobenzoic acid ethyl ester.

*Example 2*

17.9 parts of 4-aminobenzoic acid benzyl ester are diazotised in the usual manner and coupled with 13.7 parts of 1-amino-3-methyl-6-methoxybenzene in an acetic acid solution. The aminoazo dyestuff so formed is isolated, suspended in dilute hydrochloric acid, and diazotised with sodium nitrite at 15 to 20° C. The diazo solution is combined at 7 to 10° C. with a solution of 9.4 parts of hydroxybenzene in 100 parts of water, 10 parts of sodium hydroxide solution of 30% strength and 30 parts of sodium carbonate, whereupon coupling giving rise to the disazo dyestuff sets in immediately. The dyestuff is filtered off, washed with water until the washings run neutral and dried.

The new water-insoluble dyestuff of the formula

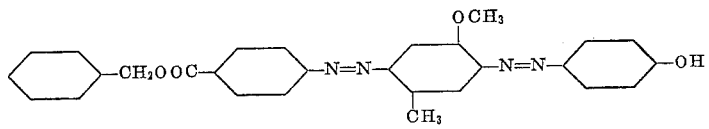

forms a brown powder which in a state of fine dispersion dyes acetate rayon, triacetate rayon and polyamide fibers orange shades of excellent fastness properties. Above all, the dyestuff dyes polyester fibers brilliant orange tints having outstanding fastness to sublimation.

By using as initial component instead of 4-aminobenzoic acid benzyl ester, 4-aminobenzoic acid propyl or isopropyl ester or 4-aminobenzoic acid butyl or isobutyl ester, dyestuffs are obtained that have equally good properties.

*Example 3*

32.9 parts of 4-amino-2-methyl-5-methoxy-1:1'-azobenzene-4'-carboxylic acid-β-hydroxyethyl ester are diazotized in the usual manner. The diazo compound is coupled at 5 to 10° C. with a solution of 9.4 parts of hydroxybenzene in 100 parts of water, 10 parts of sodium hydroxide solution of 30% strength and 30 parts of sodium carbonate. The completely precipitated disazo dyestuff is filtered off, washed with water until the washings run neutral and dried.

The new water-insoluble dyestuff of the formula

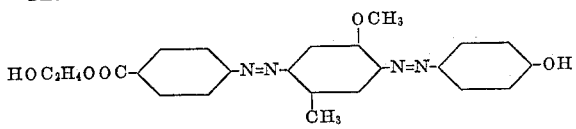

forms a brown powder which in a state of fine dispersion dyes acetate rayon, triacetate rayon and polyamide fibers orange shades having excellent properties of fastness. Above all, the new dyestuff dyes polyester fibers brilliant orange shades having outstanding fastness to sublimation.

A dyestuff having equally excellent properties is obtained by using instead of hydroxybenzene meta-cresol as final component.

When 3-methoxy-1-hydroxybenzene is used as final component, a dyestuff is obtained that dyes the aforementioned fibers red shades having equally excellent properties.

*Example 4*

19.5 parts of 4-aminobenzoic acid-β-methoxyethyl ester are diazotized in the usual manner and coupled with 15.3 parts of 1-amino-2:5-dimethoxybenzene in an acetic acid solution. The aminomonoazo dyestuff so obtained is further diazotized and coupled with 9.4 parts of hydroxybenzene in a solution rendered alkaline with sodium carbonate. The disazo dyestuff which forms spontaneously is separated, washed with water until the washings run neutral and dried.

The new water-insoluble dyestuff of the formula

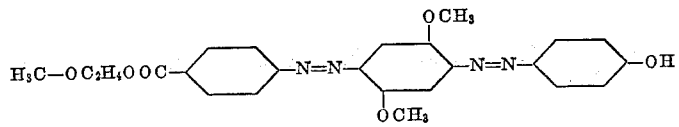

forms a brown powder which in a state of fine dispersion dyes acetate rayon, triacetate rayon and polyamide fibers red shades having excellent properties of fastness. Above all, the new dyestuff dyes polyester fibers brilliant red shades having outstanding fastness to sublimation.

Dyestuffs that dye the aforementioned fibers orange tints of identical outstanding properties of fastness are obtained by using instead of 1-amino-2:5-dimethoxybenzene: 1-amino-2-methoxy-5-methylbenzene, or 1-amino-2:5-dimethylbenzene, or 1-amino-3-methylbenzene.

When the 4-aminobenzoic acid-β-methoxyethyl ester used in the first paragraph above is replaced by the 3-methyl-4-aminobenzoic acid-β-methoxyethyl ester, a dyestuff is obtained which has equally good properties.

*Example 5*

1 part of the dyestuff obtained as described in Example 1 is ground in the wet state with 2 parts of an aqueous solution of 50% strength of sulfite waste liquor and then dried.

This dyestuff preparation is stirred with 40 parts of an aqueous solution of 10% strength of a condensation product from octadecyl alcohol with 20 molecular proportions of ethylene oxide, and 4 parts of a 40% solution of acetic acid are added. This mixture is diluted with water to form 4000 parts of a dyebath.

100 parts of a cleaned polyester fiber fabric are immersed in this bath at 50° C., the temperature is raised within ½ hour to 120 to 130° C. and dyeing is performed in a closed vessel for 1 hour at that temperature, whereupon the fabric is thoroughly rinsed. A strong, brilliant scarlet dyeing is obtained which has good fastness to light and very good fastness to sublimation.

*Example 6*

A dyebath is prepared containing 12 parts of diammonium phosphate, 40 parts of an aqueous solution of 10% strength of a condensation product from octadecyl alcohol with 20 molecular proportions of ethylene oxide in 4000 parts of water. 100 parts of a cleaned polyester fiber fabric are immersed in this bath at 50° C. and treated in it for 15 minutes. A solution of 12 parts of orthophenylphenol in dilute sodium hydroxide solution is then added, and the fabric is treated for another 15 minutes at 50 to 55° C.

A fine dispersion of 1 part of the dyestuff obtained as described in Example 4 in 2 parts of an aqueous solution of 50% strength of sulfite cellulose waste liquor is then added and the temperature is raised within ½ hour to the boil. The fabric is then dyed at the boil for 1½ to 2 hours.

The dyed fiber is then treated in a bath containing 2 parts of sodium hydroxide solution of 30% strength and 10 parts of an aqueous solution of 10% strength of a condensation product from octadecyl alcohol with 20 molecular proportions of ethylene oxide in 100 parts of water, for 30 minutes at 60 to 70° C. and then rinsed. A strong, brilliant red dyeing is obtained which has good fastness to light and very good fastness to sublimation.

What is claimed is:
1. Disazo-dyestuffs of the formula

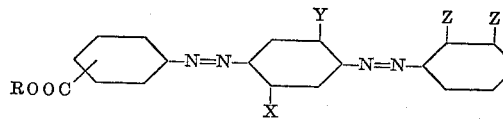

in which R represents a member selected from the group consisting of lower alkyl, lower alkoxyalkyl-, lower hydroxyalkyl and benzyl, X and Y each represent a member selected from the group consisting of hydrogen atoms, lower alkyl and alkoxy groups and in which one Z represents a hydrogen atom and the other Z represents a member selected from the group consisting of hydrogen atoms, lower alkyl and alkoxy groups and wherein the group ROOC is at least three carbon atoms away from the azo-linkage.

2. The dyestuff of the formula

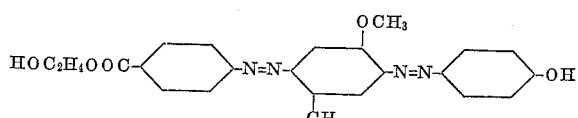

3. The dyestuff of the formula

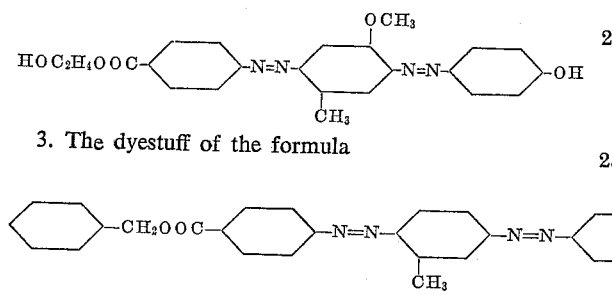

4. The dyestuff of the formula

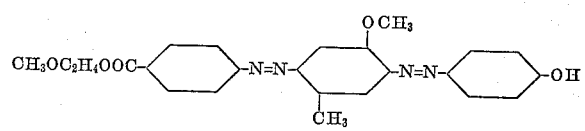

5. The dyestuff of the formula

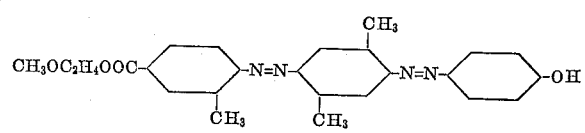

6. The dyestuff of the formula

References Cited in the file of this patent
UNITED STATES PATENTS

| | | |
|---|---|---|
| 2,289,376 | McNally et al. | July 14, 1942 |
| 2,317,387 | Kvalnes et al. | Apr. 27, 1943 |
| 2,782,185 | Merian | Feb. 19, 1957 |
| 2,829,142 | Conzetti et al. | Apr. 1, 1958 |